Feb. 22, 1966  G. P. LAMER ET AL  3,236,392
ADJUSTABLE WHEEL BASE VEHICLE
Filed July 13, 1964
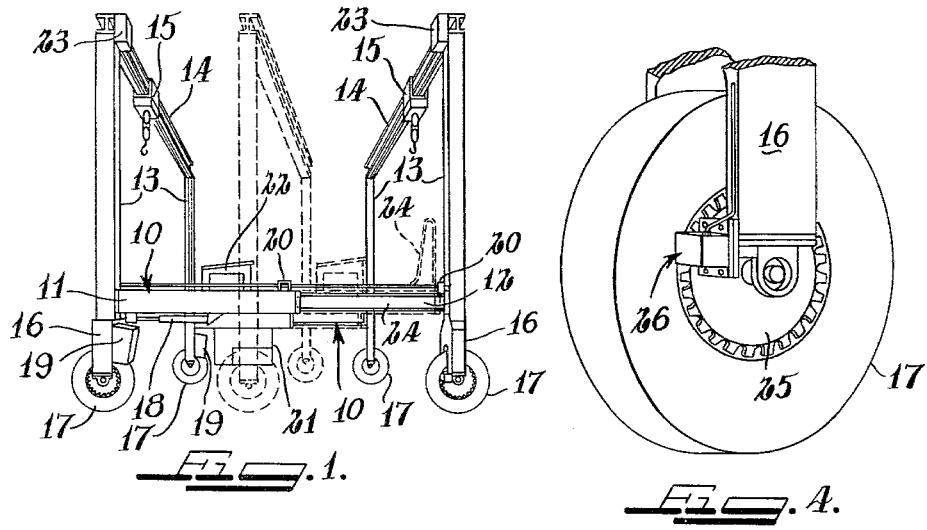
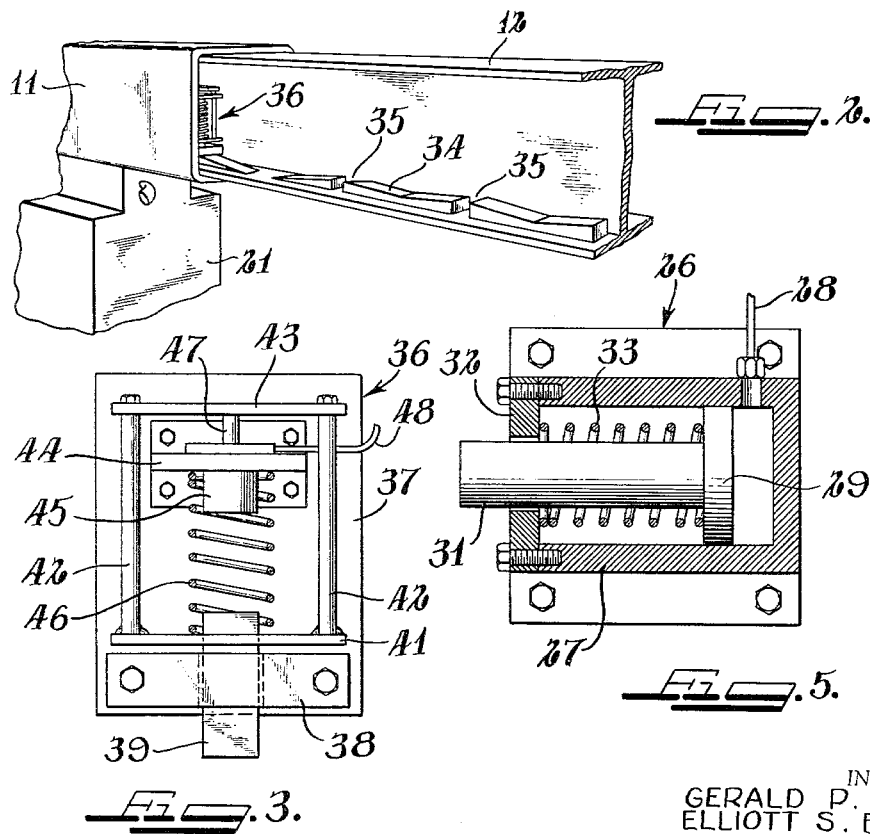
INVENTORS
GERALD P. LAMER
ELLIOTT S. BURDICK
BY
Attys.

United States Patent Office 3,236,392
Patented Feb. 22, 1966

3,236,392
ADJUSTABLE WHEEL BASE VEHICLE
Gerald P. Lamer and Elliott S. Burdick, Wausau, Wis., assignors to Drott Manufacturing Corporation, a corporation of Wisconsin
Filed July 13, 1964, Ser. No. 382,238
9 Claims. (Cl. 212—13)

This invention relates to adjustable wheel base vehicles and more particularly to a load lifting and carrying vehicle of the double gantry type whose wheel base is adjustable to vary the spacing of the gantries.

Double gantry vehicles, as heretofore constructed, have commonly included side rails on which one gantry is fixed and on which the other gantry is slidably adjustable so that the spacing between the gantries can be adjusted for handling articles of different types. In vehicles of this type when the gantries are adjusted close together the ends of the rails project beyond at least one gantry and create an awkward and undesirable situation. Furthermore, slidable mounting of one of the gantries on the side rails requires relatively large and heavy guide elements which must be formed with a relatively high degree of accuracy to provide the necessary strength and rigidity for the movable gantry.

It is accordingly an object of the present invention to provide an adjustable wheel base vehicle in which the side rails are themselves telescopically adjustable to vary the vehicle wheel base without leaving any parts of the rails projecting at either end.

Another object is to provide an adjustable wheel base vehicle of the double gantry type in which the two gantries are rigidly secured to telescopically interfitting parts of the side rails at the ends of the vehicle so that adjustment of the length of the rails will vary the effective spacing between the gantries.

According to a feature of the invention the wheels at one end of the vehicle are power driven and the wheels at the other end are provided with locking means to prevent rotation thereof so that operation of the power driven wheels will effect telescopic adjustment of the length of the side rails. The locking means is preferably in the form of ratchet discs secured to the wheels with in the locking pins normally held disengaged therefrom by springs and movable into locking contact therewith by power means, such as hydraulic cylinders controllable from a remote point.

According to another feature of the invention, the telescopically interfitting parts of the side rails are held in adjusted position by latch means which may be released by power means, such as hydraulic cylinders, controllable from a remote point to permit adjustment.

The above and other objects and features of the invention will be more readily apparent from the following description when read in connection with the accompanying drawing, in which:

FIG. 1 is a perspective view of a double gantry vehicle embodying the invention;

FIG. 2 is a partial perspective view of one of the side rails showing the latching means;

FIG. 3 is a plan view of the power control latching part;

FIG. 4 is an enlarged perspective view of one of the front wheels showing the locking means therefor; and FIG. 5 is a sectional view through the locking pin mechanism of FIG. 4.

The complete vehicle, as seen in FIG. 1, comprises two spaced parallel side rails, indicated generally at 10, which may be identical and which form the frame of the vehicle. Each of the side rails is formed of a tubular part 11 into which a beam 12 fits telescopically so that the beam can slide into or out of the tube 11 to vary the effective length of the rail. As best seen in FIG. 2, the tubular parts 11 are rectangular in section and the beams 12 are standard I-beams fitting relatively closely in the tubular parts for sliding therein. Suitable bearings may be provided, if desired, to facilitate sliding and to insure a relatively close fit between the parts.

A pair of gantry frames are provided at opposite ends of the vehicle each of which comprises upright columns 13 interconnected at their tops by top cross beams 14. The columns 13 may be rigidly secured adjacent to their lower ends to the ends of the side rail parts, respectively, as shown. Each of the top cross beams may carry a load lifting mechanism illustrated as a hoist 15, although it will be apparent that other types of load supporting mechanism can be employed, as is well understood in the art.

To support the vehicle for movement over the ground each of the columns terminates in a bifurcated portion 16 at its lower end in which a wheel 17 is rotatably supported. The bifurcated portions or yokes 16 at the left side or rear of the vehicle are preferably pivoted on vertical axes for steering turning movements which may be controlled by steering cylinders 18. The wheels 17 at the rear of the vehicle are preferably power driven by motors 19 mounted on the rear yokes. Preferably the motors 19 are hydraulically powered and are supplied with operating fluid from a pump driven by a motor in a motor housing 21 mounted on one of the rails. An operator's compartment 22 mounted on the same rail adjacent to and above the motor housing may carry the several necessary controls for the vehicle in convenient position to be operated by an operator in the compartment.

In addition to controls for the motors 19 to regulate propulsion of the vehicle there are preferably controls for other hydraulic motors, such as 23, which are mounted on the gantries to control the hoisting devices. Additionally, there are, of course, controls for the steering cylinders 18 which enable the vehicle to be steered easily. These several hydraulic motors are connected to the pump in the motor housing 21 through conduits extending along the columns and top beams and at least some of which extend along one of the side rails, as shown at 24. The conduits 24 may be secured adjacent to the end of the sleeve part 11 by clamp devices 25 and may similarly be secured either to the opposite column 13 or to the I-beam 12 adjacent to the column. When the side rail is extended these conduits will lie flat along the top of the rail, but when the side rails are contracted to the dotted line position shown in FIG. 1, the conduits which may include electrical wiring will flex upwardly, as shown in dotted lines, to extend above the side rail and to be out of the way so as not to interfere with the load being handled or with operation of the vehicle.

For adjusting the effective length of the side rails, the front wheels 17 are adapted to be locked while the rear wheels are driven in one direction or the other to effect telescopic movement of the side rail parts. For this purpose, each of the front wheels is provided with a ratchet disc 25, as best seen in FIG. 4, having a series of ratchet teeth around its periphery. Each of the bifurcated yokes 16 for the front wheels carries a ratchet pin device, indicated generally at 26, including a ratchet pin which can be moved into and out of engagement with the notches in the ratchet wheel to lock or unlock the front wheel 17.

The device 26 is illustrated in detail in FIG. 5 as including a cup shaped cylinder 27 having an inlet conduit 28 for hydraulic fluid communicating with its rear end. A piston 29 is slidable in the cylinder and has a reduced piston rod 31 which also acts as a locking pin extending through the front end of the cylinder. An annular plate 32 is formed with a central opening therein providing a guide bearing for the piston rod 31 and also acts as an abutment for a compression spring 33 which urges the piston into the cylinder.

Normally, the spring 33 will retract the piston rod 31 until its end is out of engagement with the ratchet disc 25 so that the front wheels 17 of the vehicle can turn freely. When it is desired to adjust the wheel base of the vehicle, thereby to adjust the spacing between the gantries, operating fluid may be supplied through the conduit 24 under the control of an operator in the cab 22 to the cylinders 27 to force the pistons to the left, as seen in FIG. 5, thereby moving the ends of the pins or piston rods 31 into engagement with the ratchet discs. At this time, the front wheels will be locked against rotation so that the wheel base of the vehicle can be adjusted by driving the rear wheels either forwardly or rearwardly to compress or extend the side rails.

Latching means are provided to hold the side rails in adjusted position and which may be released when it is desired to effect adjustment of the wheel base. As shown in FIG. 2, the side flange of the I-beams 12 is provided with a series of spaced blocks 34 which may preferably be generally wedge-shaped in section, as shown, and which is spaced apart at their ends to provide latching recesses 35 therebetween. The adjacent side of the sleeve member 11 carries a latching mechanism, indicated generally at 36, for cooperation with the blocks 34. The mechanism 36, as best seen in FIG. 3, comprises a mounting plate 37 secured to the inner side wall of the sleeve 11. At its lower part a plate 37 carries a block 38 which may be formed of a U-shaped piece secured to the plate 37 closed by a retainer strip to define an opening through which a latching pin 39 slidably projects for vertical movement. The latching pin is connected to a bar 41 which is in turn connected through side posts 42 to an upper cross bar 43. Above the bar 41 and below the bar 43, the plate 37 carries a projecting ledge 44 which is rigid with the plate. A hydraulic cylinder 45 is secured in an opening in the ledge 44 and projects downwardly therefrom to provide a guide projection for a compression spring 46 which acts between the ledge 44 and the bar 41 to urge the latch pin 39 downwardly. The cylinder 45 carries a piston whose piston rod 47 projects upwardly therefrom into engagement with the upper cross bar 43. Operating fluid may be supplied to the lower end of the cylinder 45 through a conduit 48 connected to the pump in the engine housing 21 through a control valve, not shown, which may be conveniently mounted in the operator's cab 22.

Normally, the pin 39 projects downwardly into one of the recesses 35 to latch the telescopically interfitting parts of the rails securely against relative movement. It will be noted that these recesses may be provided at any desired intervals to determine the positions in which the rail parts may be latched relative to each other. When it is desired to effect an adjustment of the wheel base operating fluid is supplied to the cylinders 45 through the conduits 48 to force the piston rods 47 upwardly. The piston rods will engage the upper cross bars 43 to raise the lower cross bars 41 and pins 39 so that the pins will be withdrawn from the recesses 35 and will leave the rail parts through the telescope relative to each other. After the wheel base is adjusted to approximately the desired position, fluid pressure in the cylinders 45 may be relieved and the pins 39 will be pressed downwardly by the springs 46. If the pins should fail to register with the recesses 35 they will still simply slide up over the surfaces of the blocks 34 during initial driving of the vehicle until they snap into the next adjacent recesses 35 to hold the rail parts adjusted.

It will be seen that with the present invention the operator without leaving his cab can easily effect an adjustment of the vehicle wheel base thereby to move the gantries either toward or away from each other to any desired position. Once in adjusted position the vehicle may be used in the normal manner without any projecting parts which could interfere with its use for handling of various types of loads.

While one embodiment of the invention has been shown and described in detail, it will be understood that this is for the purpose of illustration only and is not to be taken as a definition of the scope of the invention, reference being had for this purpose to the appended claims.

What is claimed is:

1. An adjustable wheel base vehicle comprising a frame having spaced parallel side rails each formed of a pair of elongated telescopically interfitting members, wheels connected to the side rails adjacent to the ends thereof, power means for driving the wheels at one end of the rails, locking means for holding the wheels at the other end of the rails against rotation whereby the rails may be telescopically shortened or extended by operating the power means, latches to hold the telescopic members of the rails in adjusted position relative to each other, and power means operable from a remote point to release the latches.

2. The vehicle of claim 1 in which the locking means comprises ratchet discs secured to the wheels, locking pins movably mounted on the frame and movable into and out of locking engagement with the discs, and means controllable from a remote point to control movement of the locking pins.

3. The vehicle of claim 1 in which the locking means comprises ratchet discs secured to the wheels, locking pins movably mounted on the frame and movable into and out of locking engagement with the discs, springs normally urging the pins out of engagement with the discs, and power means controllable from a remote point to urge the pins into engagement with the discs.

4. An adjustable wheel base vehicle comprising a pair of spaced parallel side rails each having telescopically interfitting parts whereby their length is adjustable, an inverted U-shaped gantry spanning and rigidly connected to the rails at each end thereof, each gantry being connected to corresponding rail parts at one end of the rails, a wheel mounted on and supporting each of the rail parts, power means for driving the wheels at one end of the rails, locking means for holding the wheels at the other end of the rails against rotation whereby operation of the power means will shorten or extend the rails and move the gantries toward or away from each other, and latches to hold the rail parts against relative movement.

5. The vehicle of claim 4 including power means controllable from a remote point to release the latches whereby the rails can be adjusted.

6. The vehicle of claim 4 in which the locking means is normally ineffective and power means controllable from a remote point are provided to make them effective.

7. The vehicle of claim 4 in which the locking means comprises ratchet discs on the wheels, locking pins movable into and out of locking engagement with the discs, springs normally holding the pins out of engagement with the discs, and power means controllable from a remote point to move the pins into engagement with the discs.

8. An adjustable wheel base vehicle comprising a pair of spaced parallel side rails each having telescopically interfitting parts whereby their length is adjustable, an inverted U-shaped gantry spanning and rigidly connected to the rails at each end thereof, each gantry being connected to corresponding rail parts at one end of the rails, a wheel mounted on and supporting each of the rail parts, power means for driving the wheels at one end of the rails, locking means for holding the wheels at the other end of the rails against rotation whereby operation of the power means will shorten or extend the rails and move the gantries toward or away from each other, one, of the parts of each rail having a series of longitudinally spaced latch blocks thereon defining latching recesses between them, a movable latch member on the other part of each rail, a spring urging the latch member into the recesses, and power means operable from a remote point to move the latch member out of the recesses whereby the rail can be adjusted.

9. An adjustable wheel base vehicle comprising a pair of spaced parallel side rails each having telescopically interfitting parts whereby their length is adjustable, an inverted U-shaped gantry spanning and rigidly connected to the rails at each end thereof, each gantry being connected to corresponding rail parts at one end of the rails, a wheel mounted on and supporting each of the rail parts, power means for driving the wheels at one end of the rails, locking means for holding the wheels at the other end of the rails against rotation whereby operation of the power means will shorten or extend the rails and move the gantries toward or away from each other, normally engaged latches to hold the rail parts against relative movement, fluid pressure operated devices connected to the latches to release them, the locking means being normally disengaged, fluid pressure operated devices to engage the locking means, a motor driven pump carried by one of the rails and conduits connecting the pump to the pressure operated devices, the conduits including flexible portions extending along the top of one of the rails and secured at spaced points to the parts thereof to flex vertically when the rail parts are telescoped together.

References Cited by the Examiner
UNITED STATES PATENTS 2,909,298   10/1959   Boudhuin _____ 212—13

SAMUEL F. COLEMAN, *Primary Examiner.*